United States Patent

Shaw

[15] 3,678,342

[45] July 18, 1972

[54] MOUNTING ARRANGEMENT FOR A BOARD WHICH SUPPORTS ELECTRICAL CONDUCTORS

[72] Inventor: Jeffery Isaac Shaw, Cook Hill, near Alcester, England

[73] Assignee: Joseph Lucas Industries Limited, Birmingham, England

[22] Filed: Jan. 6, 1971

[21] Appl. No.: 104,236

[52] U.S. Cl. ....................................317/100, 317/101 DH

[51] Int. Cl. ....................................................H05k 7/20

[58] Field of Search...................................317/100, 101 DH

[56] References Cited

UNITED STATES PATENTS

| | | | |
|---|---|---|---|
| 3,553,532 | 1/1971 | Cheshire | 317/100 |
| 3,576,515 | 4/1971 | Frantz | 317/101 DH |

*Primary Examiner*—Lewis H. Myers
*Assistant Examiner*—Gerald P. Tolin
*Attorney*—Holman & Stern

[57] ABSTRACT

A mounting arrangement for a printed wiring board has flexible tongues, which include bars secured to opposite sides of the board by braided metal strips, engageable in guides in a supporting structure by clamps which form part of the guides. The arrangement achieves good thermal conduction between the supporting structure and the boards without applying stresses to the latter.

14 Claims, 4 Drawing Figures

INVENTOR
JEFFREY ISAAC SHAW
Holman & Stern
ATTORNEYS

INVENTOR
JEFFREY ISAAC SHAW

ATTORNEYS

MOUNTING ARRANGEMENT FOR A BOARD WHICH SUPPORTS ELECTRICAL CONDUCTORS

This invention relates to a mounting arrangement for a member which acts as a support for electrical conductors.

A mounting arrangement for a member which acts as a support for electrical conductors, comprises a flexible thermoconductive member secured to the said conductor supporting member, a bar in spaced parallel relation to an edge of the said conductor supporting member and secured to the said flexible member, the flexible member and the bar combining to form a tongue extending from the supporting member, guide means adapted to receive the said tongue and clamping means forming part of the said guide means and operable to cause the guide means closely to engage the said tongue, whereby a good heat-conductive path exists between the supporting member and the guide means.

An example of a mounting arrangement according to the invention will now be described with reference to the accompanying drawings in which.

Figure 1:
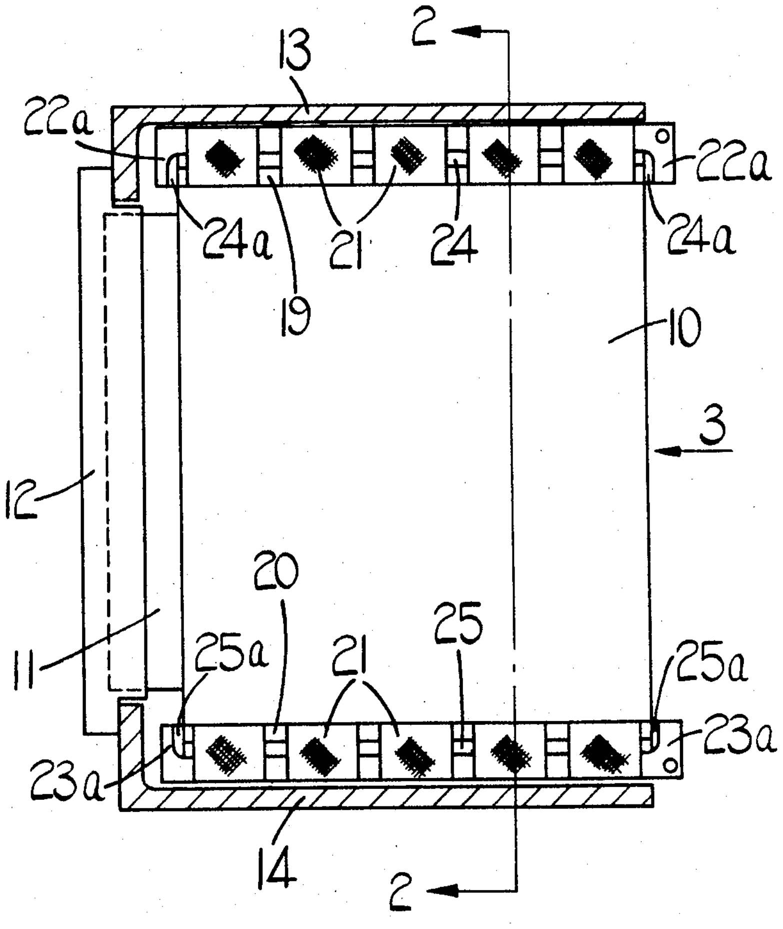
FIG. 1 is a section through a mounting arrangement.
Figure 2:
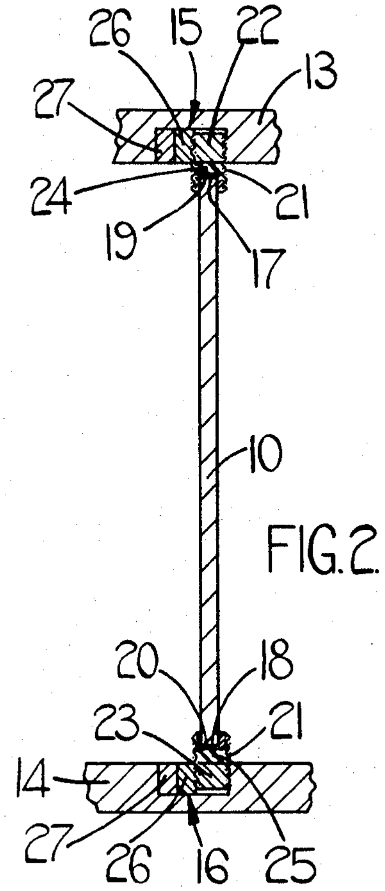
FIG. 2 is a section on line 2—2 in FIG. 1.
Figure 3:
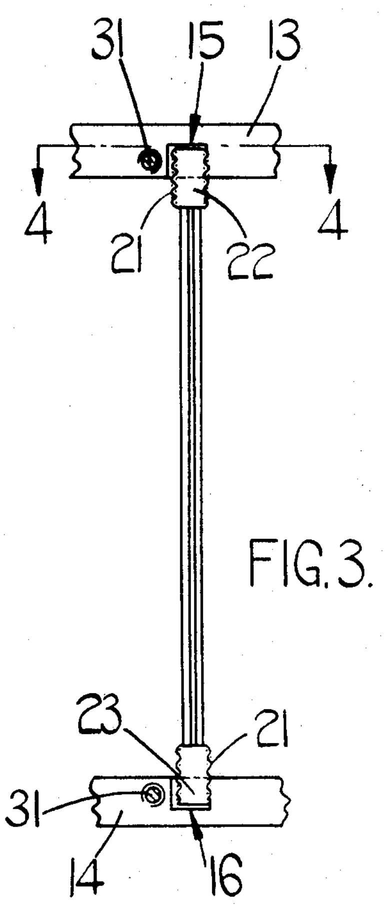
FIG. 3 is a view on arrow 3 in FIG. 1.
Figure 4:
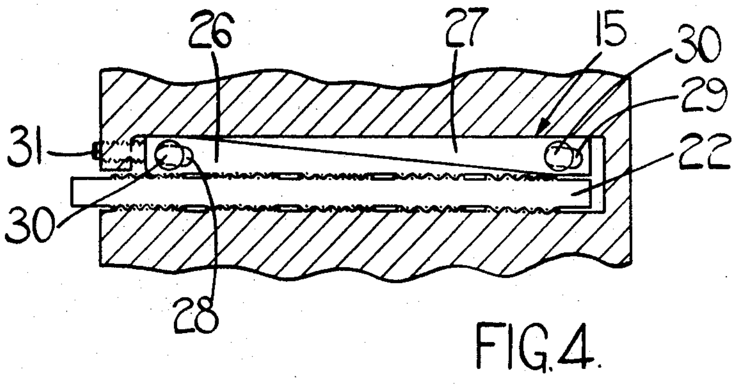
FIG. 4 is a section on line 4—4 in FIG. 3.

A substantially rectangular board 10 comprises a ceramic base which supports electric wiring formed as a so-called printed circuit. Electrical components (not shown) are attached to the wiring. The board 10 includes a portion 11 upon which the wiring terminates and which forms a plug adapted to coact with a socket 12. The socket 12 is secured to a rack assembly which includes a pair of members 13, 14 in spaced parallel relationship, the members 13, 14 being formed with respective grooves 15, 16 which form part of a guide means to align the board 10 with the socket 12.

The edges 17, 18 of the board 10 have respectively attached thereto channel-section members 19, 20. Attached to the arms of the members 19, 20 are a plurality of strips 21 of braided copper. Bars 22, 23 are secured to the strips 21 in spaced parallel relationship with the members 19, 20 respectively, The members 19, 20 are secured to the board 10 and the strips 21, are in turn secured to the bars 22, 23 by means ensuring good thermal contact, as by brazing or soldering. The bars 22, 23 include projections **22*a*, 23*a* which limit the axial movement of the bars 22, 23 relative to the board 10. Thermoconductive Silicone rubber buffers 24, 25 may be interposed between the members 19, 20 and the respective bars 22, 23 to maintain them in the said spaced parallel relation. The buffers 24, 25 may also include portions 24*a*, 25*a*, which are respectively engageable between the projections 22*a*, 23*a* and the board 10**.

Within each of the grooves 15, 16 are a pair of co-operating wedge members 26, 27. The wedge members have slots 28, 29 through which pass rivets 30 which secure the wedge members 26, 27 to the adjacent members 13. 14. The rivets 30 are shouldered so that the wedge members may move freely within the limits imposed by the slots 28, 29. Set screws 31 are threadedly engaged in the members 13, 14 and abut an end of each member 26. The slots 28, 29 are inclined to the longer dimension of the grooves 15, 16.

In use the tongues formed by the strips 21 and bars 22, 23 coact with the guides formed by the grooves 15, 16 and wedges 26, 27 to align the board 10 with the socket 12. Theboard 10 is pushed into the rack assembly to engage the socket 12.

The screws 31 are then tightened down and the wedge members 26, 27 co-operate to urge the strips 21 into close contact with the wedge member 26 and with the members 13, 14. The inclination of slots 28, 29 to the axis of the grooves 15, 16 has the effect that movement of wedge members 26, 27 in unison under the influence of screws 31 also tends to apply a clamping action to the tongues. The flexible nature of the said tongues ensures that the clamping action of the wedge members 26, 27 does not impart stresses to the board 10. When the board 10 is to be withdrawn, the screws 31 are released and friction between the strips 21 and the wedge members 26 moves the latter in a direction to release the clamping action as the board is withdrawn.

In a typical arrangement according to the invention a plurality of boards 10 are mounted, substantially as previously described, in a rack assembly in which each of the members 13, 14 is respectively formed with a plurality of grooves 15, 16 and in which each said board 10 engages as associated socket 12.

Having thus described my invention what I claim as new and desire to secure by Letters patent is:

1. A mounting arrangement including a board which acts as a support for electrical conductors, comprises a flexible thermo conductive member secured to the said board, a bar in spaced parallel relation to an edge of said board and secured to the said flexible member, the flexible member and the bar combining to form a tongue extending from the board, guide means receiving said tongue and clamping means forming part of said guide means and operable to cause the guide means to closely engage said tongue, whereby a good heat-conductive path exists between the board and the guide means.

2. A mounting arrangement as claimed in claim 1 in which said tongue includes a plurality of flexible members.

3. A mounting arrangement as claimed in claim 2 which includes a pair of flexible members respectively secured to opposite faces of the board and to opposite faces of said bar.

4. A mounting arrangement as claimed in claim 3 which includes a plurality of said pairs of flexible members.

5. A mounting arrangement as claimed in claim 1 which includes a thermo-conductive elastomeric element between said edge of the board and the bar.

6. A mounting arrangement as claimed in claim 1 which includes a projection at each end of the bar, said projections coacting with the board to limit movement thereof in the direction of the longer dimension of the bar.

7. A mounting arrangement as claimed in claim 6 which includes thermo-conductive elastomeric members secured to said projections and engaging the board.

8. A mounting arrangement as claimed in claim 1 which includes a channel member secured to said edge of the board, the, or each, flexible member being secured to said channel member.

9. A mounting arrangement as claimed in claim 1 in which the, or each, flexible member comprises a strip of braided metal.

10. A mounting arrangement as claimed in claim 1 which includes a mounting member in spaced parallel relationship with said edge of the board and having a groove which forms part of said guide means.

11. A mounting arrangement as claimed in claim 10 which includes a pair of co-operating wedge members slidably secured within said groove and actuating means for moving the wedge members to provide a clamping action.

12. A mounting arrangement as claimed in claim 11 in which each wedge member is formed with a slot and which includes shouldered elements secured within said groove and slidably extending through the slots.

13. A mounting arrangement as claimed in claim 12 in which the axes of the slots are inclined to the axis of the groove, whereby movement of the wedge members in unison by the actuating means provides a clamping action for the tongue.

14. A mounting arrangement as claimed in claim 1 in which said board has, on opposite sides thereof, a pair of substantially parallel edges, in which a tongue extends from each said edge and which includes a pair of guide means to receive the tongue.

* * * * *